(12) United States Patent
Tanaka et al.

(10) Patent No.: US 11,645,910 B2
(45) Date of Patent: May 9, 2023

(54) INFORMATION PROCESSING APPARATUS, SYSTEM, AND METHOD THAT ESTIMATES TIME FOR A USER TO TRAVEL FROM DEPARTURE LOCATION TO DESTINATION LOCATION BASED ON STOP INFORMATION OF OTHER USERS AT FACILITIES ON A ROUTE TO THE DESTINATION LOCATION

(71) Applicant: DENSO TEN Limited, Kobe (JP)

(72) Inventors: Shinichi Tanaka, Hyogo (JP); Natsumi Nishiyama, Hyogo (JP); Toshiyuki Moribayashi, Hyogo (JP); Ryo Matsui, Hyogo (JP)

(73) Assignee: DENSO TEN Limited, Kobe (JP)

( * ) Notice: Subject to any disclaimer, the term of this patent is extended or adjusted under 35 U.S.C. 154(b) by 0 days.

(21) Appl. No.: 17/463,224

(22) Filed: Aug. 31, 2021

(65) Prior Publication Data

US 2022/0309921 A1    Sep. 29, 2022

(30) Foreign Application Priority Data

Mar. 25, 2021   (JP) .............................. JP2021-051429

(51) Int. Cl.
*G08G 1/127*   (2006.01)
*G06V 20/52*   (2022.01)

(52) U.S. Cl.
CPC ............. *G08G 1/127* (2013.01); *G06V 20/53* (2022.01)

(58) Field of Classification Search
None
See application file for complete search history.

(56) References Cited

U.S. PATENT DOCUMENTS

| | | | |
|---|---|---|---|
| 2012/0004840 A1* | 1/2012 | Lee .................... | G01C 21/3423 701/465 |
| 2015/0177011 A1* | 6/2015 | Ibrahimi .............. | G01C 21/343 701/465 |
| 2016/0033289 A1* | 2/2016 | Tuukkanen ........ | G01C 21/3415 701/537 |
| 2016/0048859 A1* | 2/2016 | Doron ................... | H04W 4/025 705/7.34 |
| 2018/0120123 A1* | 5/2018 | Seok .................. | G01C 21/3661 |
| 2018/0262871 A1* | 9/2018 | Noro ................ | G06Q 10/06311 |
| 2019/0158493 A1* | 5/2019 | Aronoff .................. | G06F 21/32 |

FOREIGN PATENT DOCUMENTS

WO    2016/079778 A1    5/2016

* cited by examiner

*Primary Examiner* — John F Mortell
(74) *Attorney, Agent, or Firm* — Oliff PLC (57) ABSTRACT

An information processing apparatus according to an embodiment includes an acquisition unit, an estimation unit, and a provision unit. The acquisition unit acquires stop information concerning a situation of a stop of a user at a facility on a route from a place of departure to a place of destination. The estimation unit estimates an amount of time required to the place of destination, based on the stop information that is acquired by the acquisition unit. The provision unit provides a content that is based on the amount of time required that is estimated by the estimation unit.

16 Claims, 7 Drawing Sheets

| USER ID | POSITION | ATTRIBUTE | BONUS USE SITUATION | ... |
|---|---|---|---|---|
| U01 | POSITION #1 | ATTRIBUTE #1 | BONUS USE SITUATION #1 | ... |
| ⋮ | ⋮ | ⋮ | ⋮ | ⋮ |

FIG.6

| AREA PERSON NUMBER | AMOUNT OF TIME REQUIRED | |
| | AMOUNT OF TIME REQUIRED TO DESTINATION A | AMOUNT OF TIME REQUIRED TO DESTINATION B |
|---|---|---|
| TO X1 | a1 | b1 |
| TO X2 | a2 | b2 |
| TO X3 | a3 | b3 |
| TO X4 | a4 | b4 |
| TO X5 | a5 | b5 |
| TO X6 | a6 | b6 |
| X6 TO | a7 | b7 |

FIG.7

| AREA PERSON NUMBER | AMOUNT OF TIME REQUIRED |
|---|---|
| TO Y1 | c1 |
| TO Y2 | c2 |
| TO Y3 | c3 |
| TO Y4 | c4 |
| TO Y5 | c5 |
| TO Y6 | c6 |
| Y6 TO | c7 |

FIG.8

| | | | AREA TRAVEL REQUIRED TIME | AMOUNT OF TIME REQUIRED TO BOARDING (POSITION) |
|---|---|---|---|---|
| STATION YARD | STATION YARD REQUIRED TIME TABLE | ⇨ ESTIMATE AREA PERSON NUMBER AND CALCULATE AMOUNT OF TIME REQUIRED BY USING TABLE | T0 | T0 |
| STATION FRONT AREA | STATION FRONT AREA REQUIRED TIME TABLE | ⇨ ESTIMATE AREA PERSON NUMBER AND CALCULATE AMOUNT OF TIME REQUIRED BY USING TABLE | T00 | T0+T00 |
| AREA A1 | AREA A1 REQUIRED TIME TABLE | ⇨ ESTIMATE AREA PERSON NUMBER AND CALCULATE AMOUNT OF TIME REQUIRED BY USING TABLE | T1 | T0+T00+T1 |
| AREA A2 | AREA A2 REQUIRED TIME TABLE | ⇨ ESTIMATE AREA PERSON NUMBER AND CALCULATE AMOUNT OF TIME REQUIRED BY USING TABLE | T2 | T0+T00+T1+T2 |
| AREA A3 | AREA A3 REQUIRED TIME TABLE | ⇨ ESTIMATE AREA PERSON NUMBER AND CALCULATE AMOUNT OF TIME REQUIRED BY USING TABLE | T3 | T0+T00+T1+T2+T3 |
| AREA A4 | AREA A4 REQUIRED TIME TABLE | ⇨ ESTIMATE AREA PERSON NUMBER AND CALCULATE AMOUNT OF TIME REQUIRED BY USING TABLE | T4 | T0+T00+T1+T2+T3+T4 |
| AREA A5 | AREA A5 REQUIRED TIME TABLE | ⇨ ESTIMATE AREA PERSON NUMBER AND CALCULATE AMOUNT OF TIME REQUIRED BY USING TABLE | T5 | T0+T00+T1+T2+T3+T4+T5 |
| AREA A6 | AREA A6 REQUIRED TIME TABLE | ⇨ ESTIMATE AREA PERSON NUMBER AND CALCULATE AMOUNT OF TIME REQUIRED BY USING TABLE | T6 | T0+T00+T1+T2+T3+T4+T5+T6 |
| AREA A7 (FACILITY AREA) | AREA A7 REQUIRED TIME TABLE | ⇨ ESTIMATE AREA PERSON NUMBER AND CALCULATE AMOUNT OF TIME REQUIRED BY USING TABLE | T7 | T0+T00+T1+T2+T3+T4+T5+T6+T7 |

INFORMATION PROCESSING APPARATUS, SYSTEM, AND METHOD THAT ESTIMATES TIME FOR A USER TO TRAVEL FROM DEPARTURE LOCATION TO DESTINATION LOCATION BASED ON STOP INFORMATION OF OTHER USERS AT FACILITIES ON A ROUTE TO THE DESTINATION LOCATION

CROSS-REFERENCE TO RELATED APPLICATION(S)

This application is based upon and claims the benefit of priority to Japanese Patent Application No. 2021-051429, filed on Mar. 25, 2021, the entire contents of which are herein incorporated by reference.

FIELD

A disclosed embodiment(s) relate(s) to an information processing apparatus, an information processing system, and an information processing method.

BACKGROUND

A variety of techniques to alleviate crowding around an event facility, for example, at a time of an event such as a concert, have been proposed conventionally (see, for example, International Publication No. 2016/079778). In a conventional technique, a traffic control system of a bus service operator executes service provision at a time of an event in such a manner that a mode of a bus station that is present in an event facility is switched so as to allow a special bus to depart from such a bus station and thereby reduce a number of a person(s) that wait(s) for a bus.

However, a conventional technique has room for improvement in that more beneficial information is provided to a user. For example, in a case of an event where a lot of persons gather, it is expected that persons crowd into a transportation facility such as a bus and thereby an amount of waiting time is increased where it is difficult for a user to know what amount of waiting time is provided in such a situation accurately. That is, it is conventionally difficult for a user to know an amount of time required from a place of departure (an event facility) to a place of destination (that includes an amount of time to take a bus) accurately.

SUMMARY

An information processing apparatus according to an aspect of an embodiment includes an acquisition unit, an estimation unit, and a provision unit. The acquisition unit acquires stop information concerning a situation of a stop of a user at a facility on a route from a place of departure to a place of destination. The estimation unit estimates an amount of time required to the place of destination, based on the stop information that is acquired by the acquisition unit. The provision unit provides a content that is based on the amount of time required that is estimated by the estimation unit.

DESCRIPTION OF EMBODIMENT(S)

Hereinafter, an embodiment(s) of an information processing apparatus, an information processing system, and an information processing method as disclosed in the present application will be explained in detail, with reference to the accompanying drawing(s). Additionally, the present invention is not limited by an embodiment(s) as illustrated below.

Figure 1:
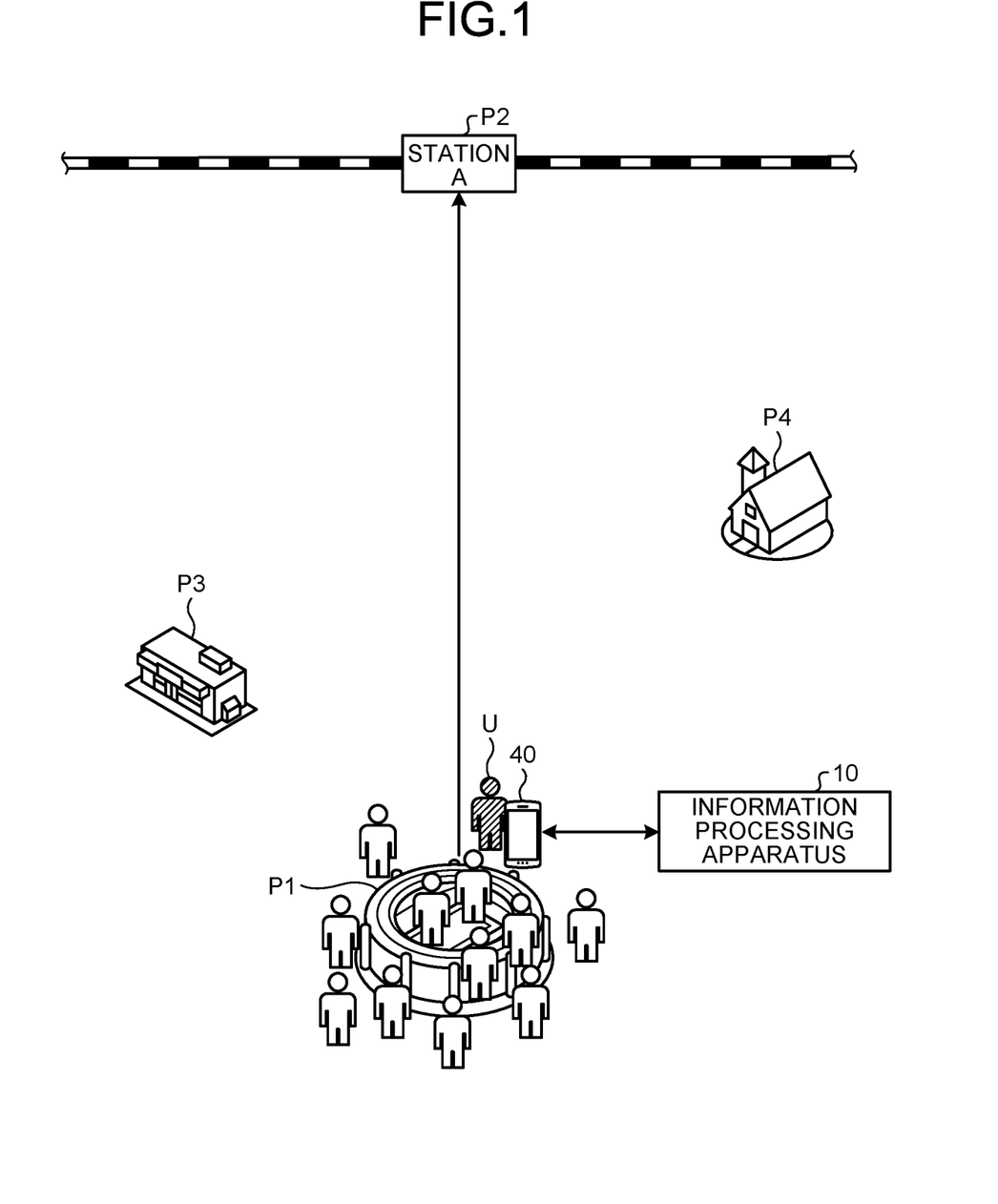
FIG. 1 is a diagram that illustrates an outline of an information processing method according to an embodiment.
Figure 2:
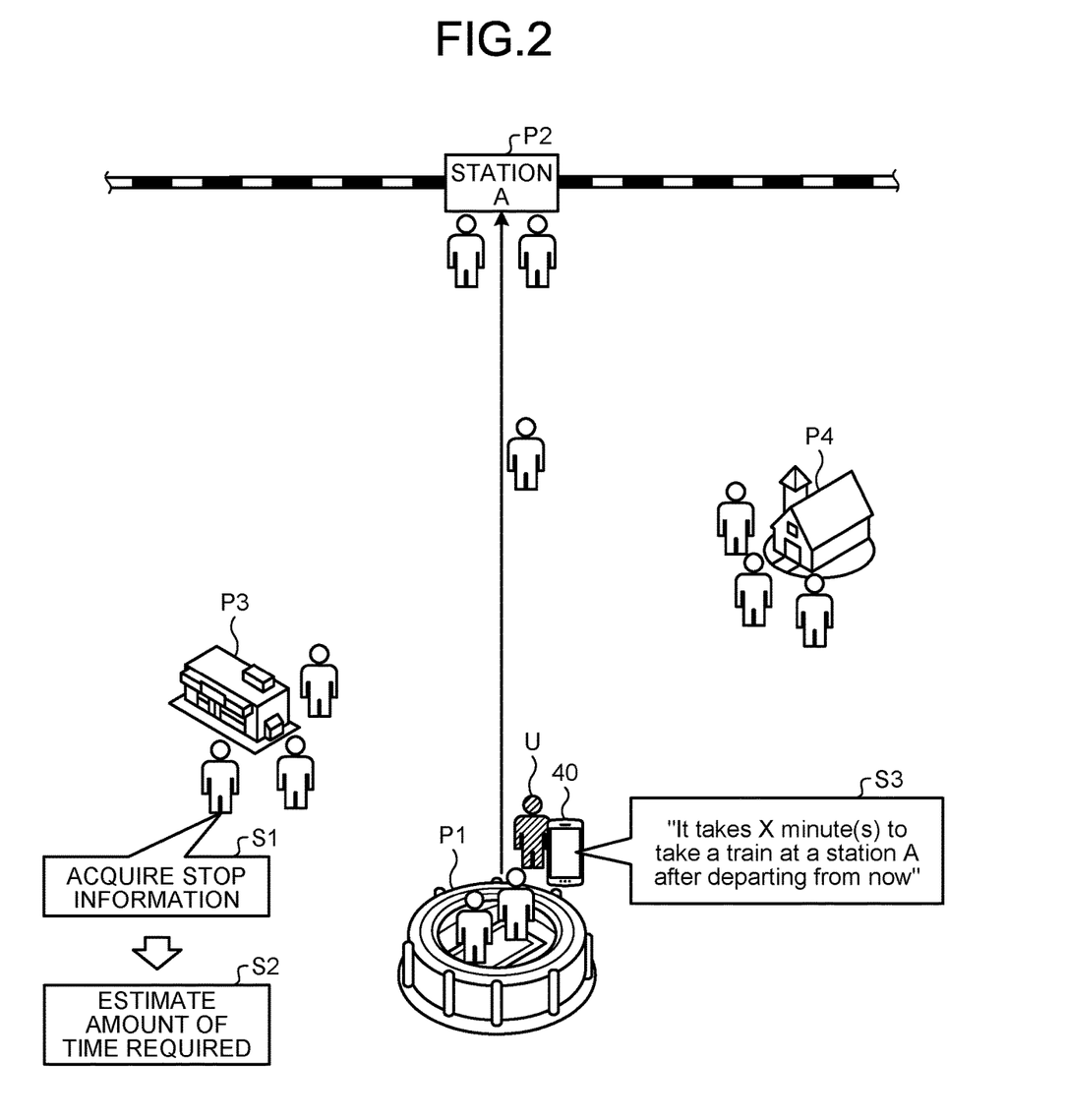
FIG. 2 is a diagram that illustrates an outline of an information processing method according to an embodiment.

First, an outline of an information processing method according to an embodiment will be explained by using FIG. 1 and FIG. 2. FIG. 1 and FIG. 2 are diagrams that illustrate an outline of an information processing method according to an embodiment. An information processing method according to an embodiment is executed by an information processing apparatus 10 as illustrated in FIG. 1. Additionally, as illustrated in FIG. 1, the information processing apparatus 10 according to an embodiment is communicably connected to a terminal device 40 that is possessed by a user U where it is possible to execute transmission and receipt of a variety of information.

Herein, FIG. 1 illustrates a situation where, in an event facility that is a place of departure P1, a user U after an event has finished intends to take a train from a nearest station A that is a place of destination P2.

In such a situation, a lot of other users that have participated in an event are also likely to take a train from a nearest station A similarly to a user U. In such a case, if other users crowd into and gather at a station A, a predetermined amount of time after a user U departs from a place of departure P1 and before he/she takes a train at a place of destination P2 may be increased, so that it is quite important to know what amount of time required is provided to a user U accurately.

However, as illustrated in FIG. 2, other users after an event have finished include a person(s) that head(s) to a station A directly and a person(s) that stop(s) at a facility P3 or a facility P4 that is present in a middle of a route, spend(s) an amount of time, and subsequently head(s) to the station A, so that it is difficult to estimate what degree of crowding is caused in what time zone. That is, other users execute various types of movements, so that it is difficult to estimate an amount of time required to a place of destination P2 accurately.

Accordingly, in an information processing method according to an embodiment, an amount of time required to a place of destination P2 is estimated at high accuracy in view of a situation of a stop(s) of another/other user(s) at a facility P3, P4 and a content that is based on an estimated amount of time required is provided.

Specifically, as illustrated in FIG. 2, the information processing apparatus 10 first acquires stop information concerning a situation of a stop(s) of a user(s) (another/other user(s) as described above) at a facility P3, P4 (step S1). A facility P3, P4 is a facility where another/other user(s) is/are capable of stopping. A facility P3, P4 may be any type such as a restaurant, a retailer, a bookstore, or a park.

Furthermore, although FIG. 2 illustrates a case where a facility P3, P4 is a facility that is present outside an event facility that is a place of departure P1, it may be a store inside the event facility (such as a goods department), a store in a station yard that is a place of destination P2, or the like. That is, a facility P3, P4 may be any facility as long as it is possible for another/other user(s) to stop and spend an amount of time in such a facility.

Stop information includes information such as whether another/other user(s) stop(s) at a facility P3, P4 at present, whether or not he/she/they head(s) to the facility P3, P4, or whether he/she/they acquire(s) (use(s)) a coupon or the like that is provided by the facility P3, P4.

For example, stop information is information of a number of another/other user(s) that is/are present around a facility P3, P4 that is based on an image of a stationary camera 60 (see FIG. 3) that is set on a route or the like, information concerning a situation of use of a bonus (such as a coupon) of the facility P3, P4 that is provided to another/other user(s), information that is based on a change of positional information of another/other user(s), or the like where a detail of such a point will be described later.

Then, in an information processing method according to an embodiment, an amount of time required to a place of destination P2 is estimated, based on stop information (step S2). For example, the information processing apparatus 10 predicts how much time it takes for each user to reach a place of destination P2 from stop information, so as to predict a number of a user(s) that is/are present at the place of destination P2 in each time zone. Then, the information processing apparatus 10 estimates an amount of time required to a place of destination P2 from a departure time of a user U, based on a predicted number of a user(s).

Then, in an information processing method according to an embodiment, a content that is based on an estimated amount of time required is provided to a terminal device 40 of a user U (step S3). In an example as illustrated in FIG. 2, an example where a content concerning an amount of time required such as "It takes X minute(s) to take a train at a station A after departing from now" is provided is illustrated. Additionally, a detail of a content that is provided by the information processing apparatus 10 will be described later.

Thus, in an information processing method according to an embodiment, an amount of time required to a place of destination is estimated in view of a situation of a stop(s) of another/other user(s), so that it is possible for a user U to know an amount of time required to a place of destination at high accuracy. That is, in an information processing method according to an embodiment, it is possible to provide beneficial information to a user U.

Figure 3:
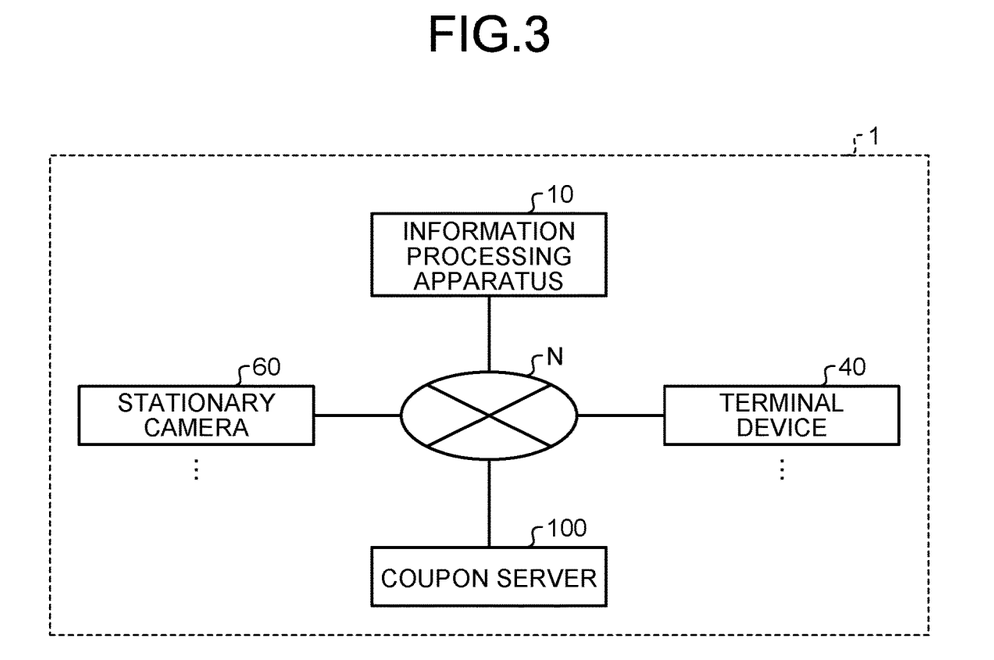
FIG. 3 is a block diagram that illustrates a configuration example of an information processing system according to an embodiment.

Next, a configuration example of an information processing system according to an embodiment will be explained by using FIG. 3. FIG. 3 is a block diagram that illustrates a configuration example of an information processing system 1 according to an embodiment.

As illustrated in FIG. 3, the information processing system 1 includes an information processing apparatus 10 that executes an information processing method, a terminal device 40, a stationary camera 60, and a coupon server 100 where these are communicably connected through a communication network N such as an Internet network. Additionally, although FIG. 3 illustrates each of the terminal device 40, the stationary camera 60, and the coupon server 100 one by one for simplicity of illustration thereof, a plurality thereof may be provided.

The terminal device 40 is a device that is possessed and used by a user U or another user. Additionally, it is possible to use, for example, a smartphone or a tablet terminal as the terminal device 40 where this is not limiting.

The terminal device 40 includes, for example, a Global Positioning System (GPS) receiver that detects positional information that indicates a position of a user (accurately, a position of the terminal device 40) based on a signal from a GPS satellite, or the like. It is possible for the terminal device 40 to transmit detected positional information to the information processing apparatus 10.

Furthermore, it is possible for the terminal device 40 to receive a variety of information that is provided from the information processing apparatus 10 and display it on a non-illustrated display unit or output a sound.

The stationary camera 60 is installed on a route, inside a facility, around the facility, around a place of departure, or around a place of destination.

It is possible for the stationary camera 60 to capture an image on a route where a user moves, inside a facility, around the facility, around a place of departure, or around a place of destination and transmit a captured image to the information processing apparatus 10. Additionally, although an image of the stationary camera 60 is video data, this is not limiting and still image data or the like may be provided.

Additionally, the stationary camera 60 may be a human body detection sensor that detects a person(s) on a route where a user moves, inside a facility, around the facility, around a place of departure, or around a place of destination. It is possible to adopt, for example, a pyroelectric sensor that uses an infrared signal, or the like, as a human body detection sensor.

The coupon server 100 is a server that provides a coupon that is a bonus capable of being used in a facility to the terminal device 40 of a user. Additionally, a bonus may be a point capable of being used in a facility, a ticket for the facility, or the like, other than a coupon. Furthermore, it is possible for the coupon server 100 to provide information concerning a situation of use of a bonus for a user to the information processing apparatus 10.

Information concerning a situation of use is, for example, information such as a number of a used bonus(es) or a number of an issued bonus(es) (a number of that/those planned to use).

Figure 4:
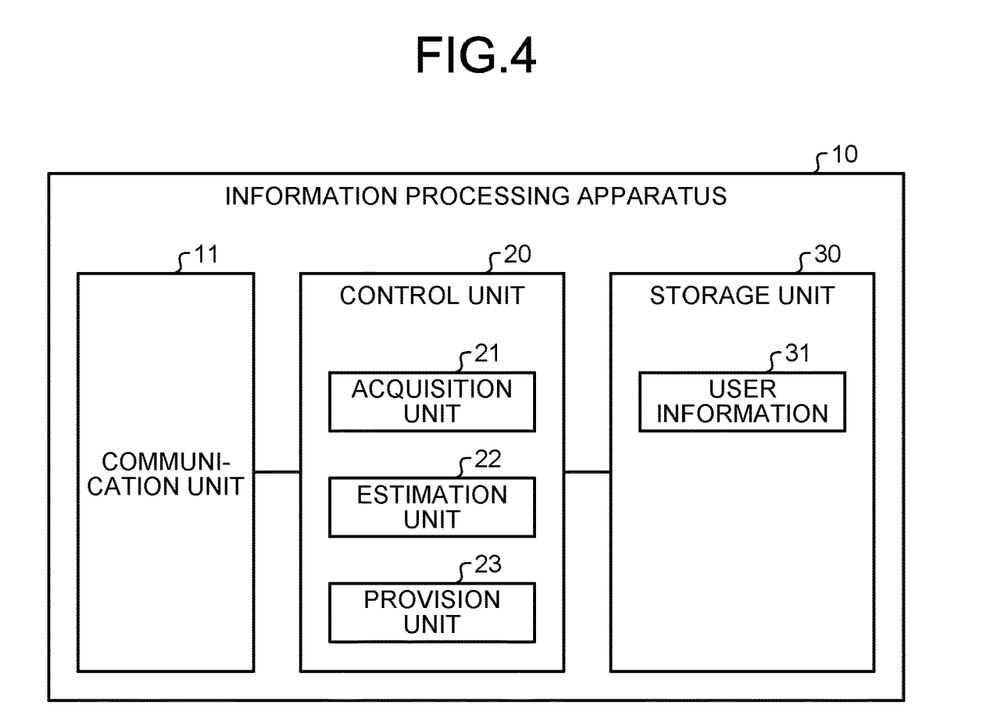
FIG. 4 is a functional block diagram that illustrates a configuration example of an information processing apparatus according to an embodiment.

Next, a configuration example of an information processing apparatus 10 according to an embodiment will be explained by using FIG. 4. FIG. 4 is a functional block diagram that illustrates a configuration example of the information processing apparatus 10 according to an embodiment. Additionally, a block diagram of FIG. 4 illustrates only a component(s) that is/are needed to explain a feature(s) of the present embodiment as a functional block(s) and omits illustration of a general component(s).

In other words, each component that is illustrated in a block diagram of FIG. 4 is functionally conceptual and does not have to be physically configured as illustrated therein. For example, a specific mode of dispersion or integration of respective functional blocks is not limited to illustration thereof where it is possible to disperse or integrate, and thereby configure, all or a part(s) thereof functionally or physically in any unit depending on a variety of loads, a situation of use thereof, or the like.

As illustrated in FIG. 4, the information processing apparatus 10 includes a communication unit 11, a control unit 20, and a storage unit 30.

The communication unit 11 is a communication interface that is connected to the communication network N so as to be two-way-communicable and executes transmission and receipt of information with the terminal device 40, the stationary camera 60, the coupon server 100, and the like.

The control unit 20 includes an acquisition unit 21, an estimation unit 22, and a provision unit 23, and includes, for example, a computer that has a Central Processing Unit (CPU), a Read Only Memory (ROM), a Random Access Memory (RAM), a hard disk drive, an input/output port, and the like, and a variety of circuits.

For example, a CPU of a computer reads and executes a program that is stored in a ROM so as to function as the acquisition unit 21, the estimation unit 22, and the provision unit 23 of the control unit 20.

Furthermore, it is possible to provide at least a part(s) or all of the acquisition unit 21, the estimation unit 22, and the provision unit 23 of the control unit 20 that is/are composed of hardware such as an Application Specific Integrated Circuit (ASIC) or a Field Programmable Gate Array (FPGA).

Furthermore, the storage unit 30 is, for example, a storage unit that is composed of a storage device such as a non-volatile memory, a data flash, or a hard disk drive. Such a storage unit 30 stores user information 31, a variety of programs, and the like.

Figure 5:
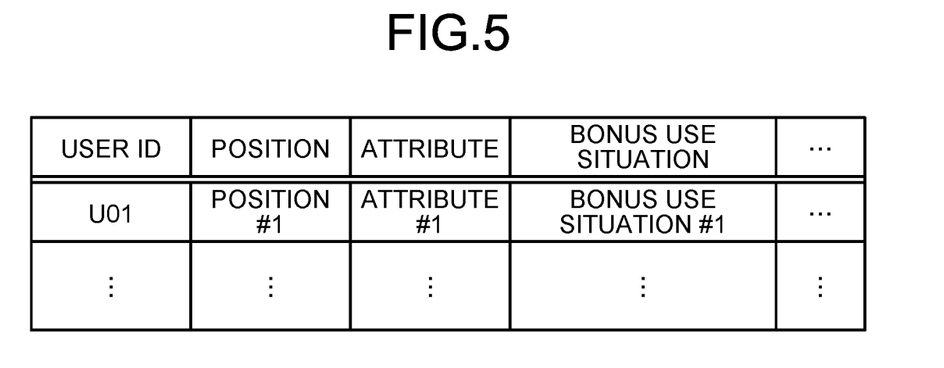
FIG. 5 is a diagram that illustrates an example of user information.

The user information 31 is information concerning a user(s) (that include(s) a user U and/or another/other user(s)). FIG. 5 is a diagram that illustrates an example of the user information 31. As illustrated in FIG. 5, the user information 31 includes items of a "user ID", a "position", an "attribute", a "bonus use situation", and the like where the respective items are associated with one another.

A "user ID" is identification information that identifies a user. A "position" is information that indicates a position of a user (accurately, a position of the terminal device 40). A "position" is represented by, for example, coordinates such as a latitude and a longitude. Furthermore, in a case where a user is present at a predetermined facility, a "position" may be a position inside the facility. For example, in a case where a user is present in a stadium or a concert hall, a "position" may be a position of a seat in the stadium or the concert hall.

An "attribute" is attribute information that indicates an attribute of a user. An "attribute" includes information such as an age, a gender, an address, a hobby, or a preference of a user where these are merely illustrations and are not limiting.

A "bonus use situation" includes information concerning a situation of use of a bonus. For example, a "bonus use situation" includes information such as whether or not a bonus has been used, a type of an issued bonus, or a number of issued one(s).

Additionally, although abstract descriptions such as a "position #1", an "attribute #1", and a "bonus use situation #1" are conveniently provided in an example as illustrated in FIG. 5, information of a character string as described above or specific information such as a score or a numerical value is stored actually.

Next, respective functions (the acquisition unit 21, the estimation unit 22, and the provision unit 23) of the control unit 20 will be explained.

The acquisition unit 21 acquires a variety of information. For example, the acquisition unit 21 acquires participant number information concerning a number of a user(s) that participate(s) in an event. For example, the acquisition unit 21 acquires information of a number of a sold ticket(s) for participating in an event as participant number information.

Furthermore, the acquisition unit 21 acquires information concerning whether or not a user participates in an event as a group (a family, a friend, or the like), from information that is input by such a user at a time of purchase of a ticket(s).

Furthermore, the acquisition unit 21 may acquire (estimate) participant number information based on an image of the stationary camera 60 that is installed in an event facility. Furthermore, the acquisition unit 21 acquires exit information that indicates a situation of an exit of another/other user(s) after event termination, based on an image of the stationary camera 60.

For example, the acquisition unit 21 acquires a number of another/other user(s) that remain(s) at a seat(s) thereof or a number of another/other exiting user(s) as exit information, based on an image of the stationary camera 60 that captures an image of a seat(s) for a spectator(s). Additionally, in a case where an event facility is large, exit information may be acquired based on images of respective areas that are captured by a plurality of stationary cameras 60.

Furthermore, the acquisition unit 21 acquires stop information concerning a situation of a stop(s) of another/other user(s) at a facility. For example, the acquisition unit 21 acquires stop information that is estimated based on an image of the stationary camera 60. Specifically, the acquisition unit 21 acquires, as stop information, information of a number of another/other user(s) that is/are present around a facility or inside the facility or an amount of staying time that indicates how long each of other users stays in the facility, based on an image of the stationary camera 60.

Furthermore, the acquisition unit 21 acquires, as stop information, a number of another/other user(s) that head(s) to a facility, based on an image of the stationary camera 60. That is, the acquisition unit 21 acquires, as stop information, a number of another/other user(s) that has/have already stopped at a facility or another/other user(s) that will stop thereat from now. Thus, an image of the stationary camera 60 is used, so that it is possible to acquire highly accurate stop information.

Additionally, although the acquisition unit 21 acquires stop information that is a result of estimation in the above, the acquisition unit 21 may estimate stop information, per se, based on an image or may acquire stop information that is estimated by another server.

Furthermore, the acquisition unit 21 acquires stop information that is estimated based on a situation of use of a bonus of a facility that is provided to another/other user(s). Specifically, the acquisition unit 21 acquires information concerning a situation of use of a bonus from the coupon server 100. For example, the acquisition unit 21 acquires information of whether or not a bonus has been used, a number of a used bonus(es), or a number of an issued bonus(es) (a number of that/those planned to use), or the like.

Then, the acquisition unit 21 acquires, as stop information, a number of another/other user(s) that has/have already stopped at a facility (or has/have already used a bonus) or another/other user(s) that intend(s) to stop thereat from now (or intend(s) to use a bonus), based on a situation of use of a bonus. Thus, information of a situation of use of a bonus is used, so that it is possible to acquire highly accurate stop information.

Additionally, the acquisition unit 21 may acquire a situation of use of a bonus from the coupon server 100 so as to estimate stop information or may acquire stop information that is estimated by another server.

Furthermore, the acquisition unit 21 may acquire stop information that is estimated based on positional information of a terminal device(s) that is/are possessed by another/other user(s). Specifically, the acquisition unit 21 acquires, as stop information, information of a number of another/other user(s) where positional information of another/other user(s) is positioned around a facility or inside the facility or a number of another/other user(s) that head(s) to the facility. Thus, positional information of a user is used, so that it is possible to acquire highly accurate stop information.

Furthermore, stop information may include information of an amount of staying time that is dependent on a type of a facility. Stop information may include, for example, information of an amount of staying time that is 60 minutes in a case where a type of a facility is a restaurant or an amount of staying time that is 15 minutes in a case where it is a goods department such as a store. Additionally, information of an amount of staying time may be a preliminarily set value or may be calculated based on a previous and actual amount of staying time.

The estimation unit 22 estimates an amount of time required to a place of destination, based on stop information that is acquired by the acquisition unit 21. Specifically, the estimation unit 22 calculates, as a number of another/other user(s) that head(s) to a place of destination, a number provided by subtracting a number of another/other user(s) that stop(s) at a facility and a number of another/other user(s) that intend(s) to stop at the facility that are based on stop information from a number of another/other user(s) that participate(s) in an event (participant number information) or a number of another/other user(s) that has/have exited (exit information).

The estimation unit 22 calculates a number of another/other user(s) that head(s) to a place of destination in each time zone. Specifically, the estimation unit 22 first estimates an arrival time of another/other user(s) at a place of destination in view of an amount of time that is spent for a stop at a facility. For example, the estimation unit 22 estimates an arrival time based on an amount of travel time that is needed in a case where he/she/they head(s) to a place of destination through a facility and an amount of staying time at the facility.

Then, the estimation unit 22 calculates a number of another/other user(s) that head(s) to (or arrive(s) at) a place of destination in each time zone, based on an estimated arrival time and estimates a number of another/other user(s) in each time zone, based on a result of such calculation.

Then, the estimation unit 22 estimates an amount of time required to a place of destination, based on an estimated number of another/other user(s). An amount of time required may be an amount of time before arriving at a place of destination where, for example, in a case where the place of destination is a transportation facility, an amount of time that is needed to take such a transportation facility may be included therein.

Specifically, in a case where a place of destination is a train, an amount of time before arriving at a platform from a ticket gate or an amount of time that includes an amount of time before departure of a train may be provided as an amount of time required.

That is, the estimation unit 22 estimates a number of another/other user(s) that is/are present from a ticket gate to a platform or a passenger load factor of a train, based on a number of another/other user(s) in stop information, or obtains and utilizes operation information of a train, so as to estimate an amount of time required before taking a train.

Thus, the estimation unit 22 estimates an amount of time required that includes an amount of time that is needed to take a transportation facility, so that it is possible to provide more beneficial information to a user by the provision unit 23 as a latter unit.

Furthermore, in a case where a transportation facility is a train, the estimation unit 22 may estimate an amount of time required before taking a train for each travel destination of the train. For example, the estimation unit 22 preliminarily estimates a rate of a user(s) for each travel destination from a previous situation of a train and multiplies a number of another/other user(s) in stop information by such a rate, so as to estimate a number of another/other user(s) for each travel destination and estimate an amount of time required before taking a train for each travel destination.

Thus, the estimation unit 22 estimates an amount of time required before taking a train for each travel destination of a train, so that it is possible to provide more beneficial information to a user by the provision unit 23 as a latter unit.

Figure 6:
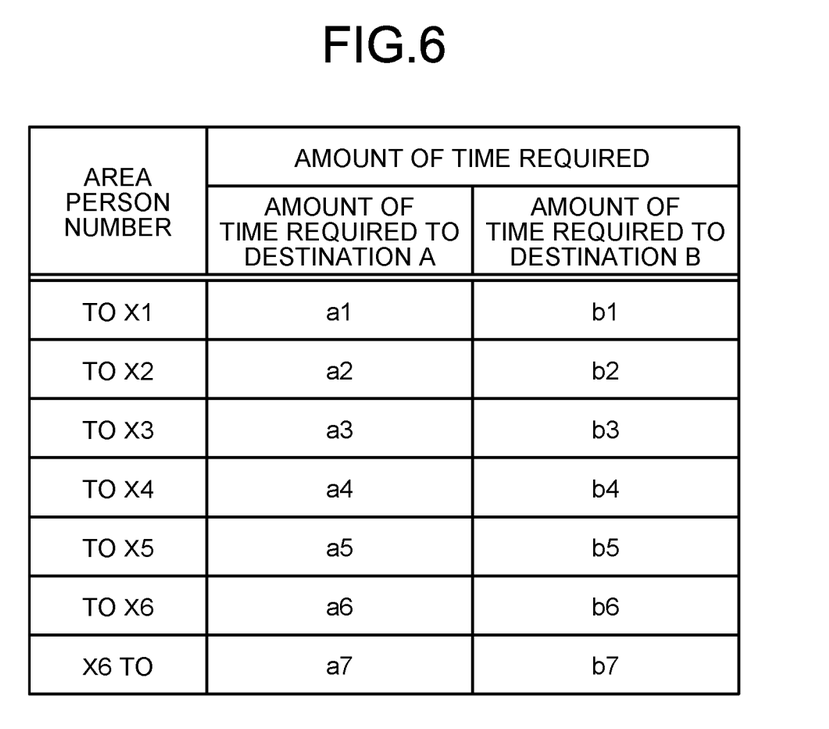
FIG. 6 is a diagram that illustrates an example of a station yard required time table.
Figure 7:
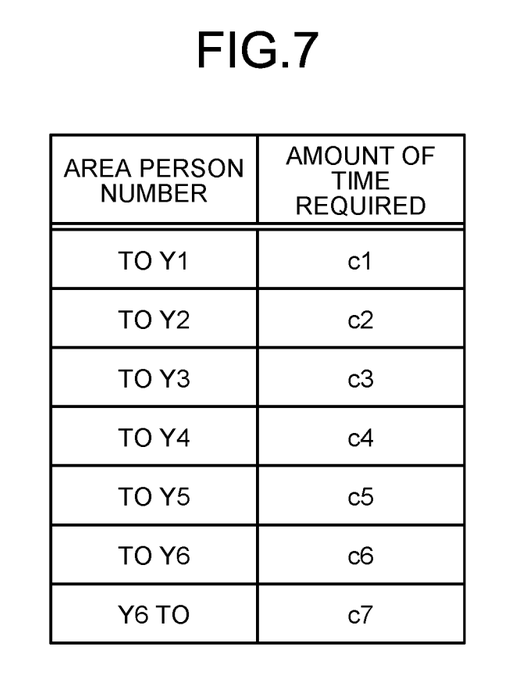
FIG. 7 is a diagram that illustrates an example of a required time table in an area.
Figure 8:
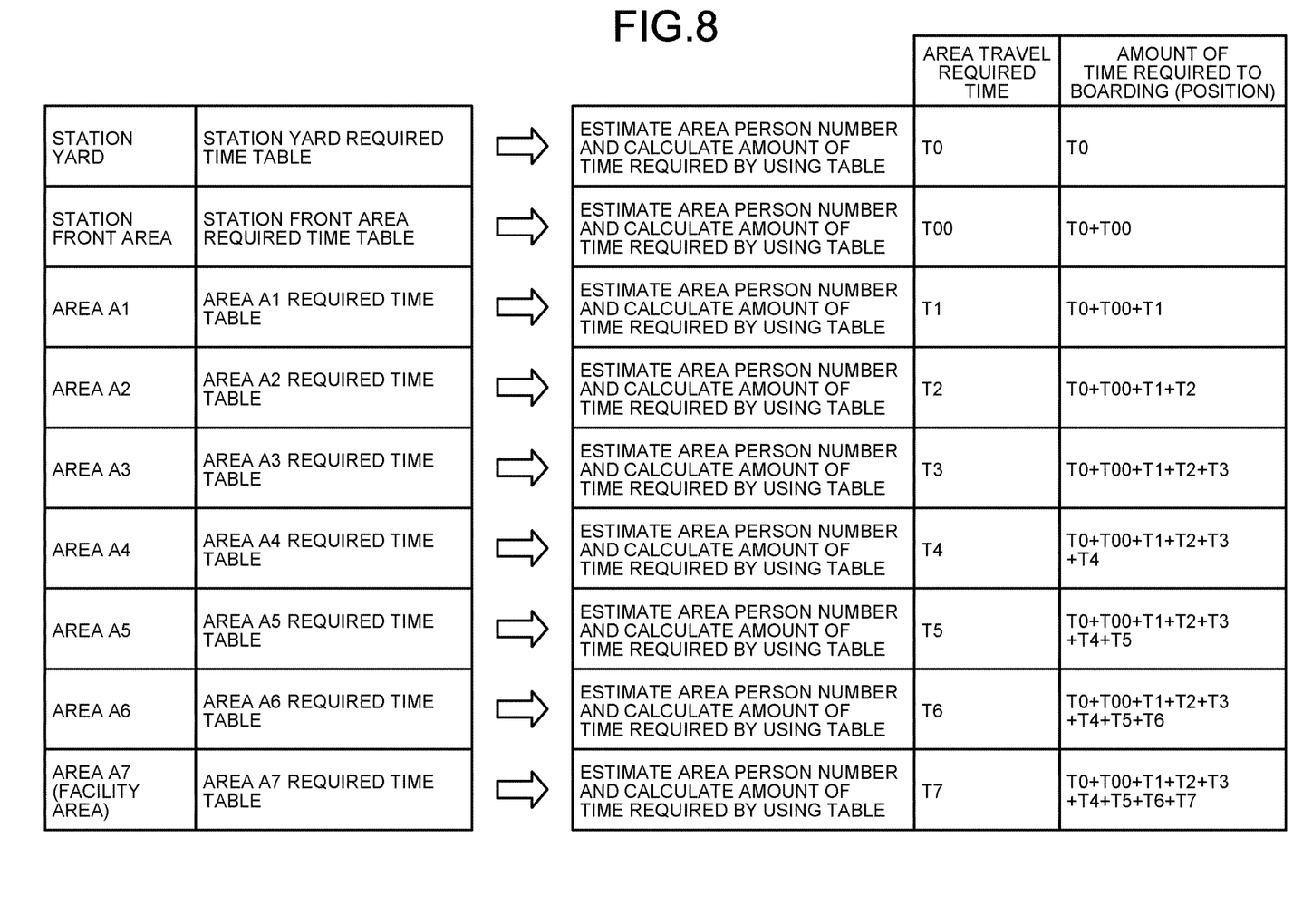
FIG. 8 is a diagram that illustrates an example of a calculation method for an amount of time required that is executed by an estimation unit.

Herein, a calculation method for an amount of time required that is executed by the estimation unit 22 will be explained by using FIG. 6 to FIG. 8. FIG. 6 is a diagram that illustrates an example of a station yard required time table. FIG. 7 is a diagram that illustrates an example of an area required time table. FIG. 8 is a diagram that illustrates an example of a calculation method for an amount of time required that is executed by the estimation unit 22. Additionally, information of respective tables as illustrated in FIG. 6 and FIG. 7 is preliminarily stored in the storage unit 30.

Additionally, areas as illustrated in FIG. 6 to FIG. 8 refer to, for example, areas provided by separating a route from a place of departure to a place of destination on a distance basis. A station yard required time table as illustrated in FIG. 6 illustrates an amount of time required for each number of a person(s) that is/are present in a station yard (an area person number). Furthermore, a station yard required time table as illustrated in FIG. 6 illustrates an amount of time required for each travel destination of a train (a destination A and a destination B).

For example, FIG. 6 illustrates that, in a case where an area person number is "X1" or less, an amount of time required before taking a train to a destination A is "a1" and an amount of time required before taking a train to a destination B is "b1". Additionally, an area person number as illustrated in FIG. 6 may include a number of a person(s) that is/are present in a station yard and around a station. Furthermore, an area person number may further be separated by a number of a person(s) for each travel destination of a train (a number of a person(s) on a platform).

An area required time table as illustrated in FIG. 7 illustrates an amount of time required to pass through an area for each area person number (an amount of time required before reaching an adjacent area). For example, FIG. 7 illustrates that, in a case where an area person number is "Y1" or less, an amount of time required to pass through an area is "c1".

Additionally, it is possible to set information of respective tables as illustrated in FIG. 6 and FIG. 7 based on a previous performance. Furthermore, a table in view of another/other factor(s) such as weather and/or a time zone may be produced and stored. Furthermore, it is possible to produce each table by learning of artificial intelligence.

The estimation unit 22 estimates an amount of time required as illustrated in FIG. 8 by using respective tables in FIG. 6 and FIG. 7. FIG. 8 illustrates an example of a calculation method for an amount of time required on a route from an area A7 that includes an event facility or the like to a station yard. That is, a route from an event facility to a station is an area A7, an area A6, an area A5, an area A4, an area A3, an area A2, an area A1, an station front area, and a station yard in sequence.

The estimation unit 22 acquires stop information where, in a case where an area A7 is a place of departure, an area person number in each of an area A7, an area A6, an area A5, an area A4, an area A3, an area A2, an area A1, a station front area, and a station yard is estimated.

Then, the estimation unit 22 determines an amount of time required for each area from an estimated area person number with reference to tables as illustrated in FIG. 6 and FIG. 7. In an example as illustrated in FIG. 8, an amount of time required in a station yard (area travel required time) is "T0", an amount of time required in a station front area is "T00", an amount of time required in an area A1 is "T1", an amount of time required in an area A2 is "T2", an amount of time required in an area A3 is "T3", an amount of time required in an area A4 is "T4", an amount of time required in an area A5 is "T5", an amount of time required in an area A6 is "T6", and an amount of time required in an area A7 is "T7".

Additionally, for "T0" and "T00", one of "a1" to "a7" and "b1" to "b7" as illustrated in FIG. 6 is input, and for "T1" to "T7", one of "c1" to "c7" as illustrated in FIG. 7 is input.

Then, the estimation unit 22 calculates an amount of time required before taking a train from a place of departure (or arriving at a boarding position), based on an estimated amount of time required for each area. For example, in a case where a place of departure is an area A7, an amount of time provided by adding amounts of time required "T0" to "T7" is calculated as an amount of time required. That is, an amount of time required is "T0+T00+T1+T2+T3+T4+T5+T6+T7".

Furthermore, for example, in a case where a place of departure is an area A3, an amount of time provided by adding amounts of time required "T0" to "T3" is calculated as an amount of time required. That is, an amount of time required is "T0+T00+T1+T2+T3". Additionally, in a case where a place of departure is an area A3, a determination process for amounts of time required for an area A4 to an area A7 is omitted.

Thus, the estimation unit 22 uses tables as illustrated in FIG. 6 and FIG. 7, so that it is possible to estimate an amount of time required at high accuracy.

The provision unit 23 provides a content that is based on an amount of time required that is estimated by the estimation unit 22. For example, in a case where a user U requests an amount of time required, the provision unit 23 transmits information of an amount of time required that is based on a current place of a user U to the terminal device 40.

Additionally, information of an amount of time required may be information that directly and simply indicates an amount of time required from a current place to a designation (before taking a transportation facility) or may indicate information of an amount of time required in each time zone. Furthermore, information of an amount of time required may be information of a departure time of a train that is capable of being taken based on a result of estimation of the estimation unit 22. Furthermore, information of an amount of time required may indicate information of an amount of time required for each travel destination of a train.

Furthermore, information of an amount of time required may be information in a time zone where an amount of time required is smallest. Furthermore, information of an amount of time required may be information of an amount of time that should be spent before a time zone where an amount of time required is smallest, in other words, information of a recommended amount of time that should be spent at a stop.

Furthermore, the provision unit 23 may issue a bonus that is based on such a recommended amount of time (a bonus concerning an action suitable for spending a recommended amount of time, such as a coupon of a menu where diet thereof is completed within a recommended amount of time) or may provide information of a recommended facility that is based on a recommended amount of time (a facility where a reasonable utilization time is close to a recommended amount of time). Specifically, the provision unit 23 may provide information that recommends a stop at a restaurant (an example of a facility where a reasonable utilization time is set at 60 minutes) in a case where a recommended amount of time is 60 minutes.

Figure 9:
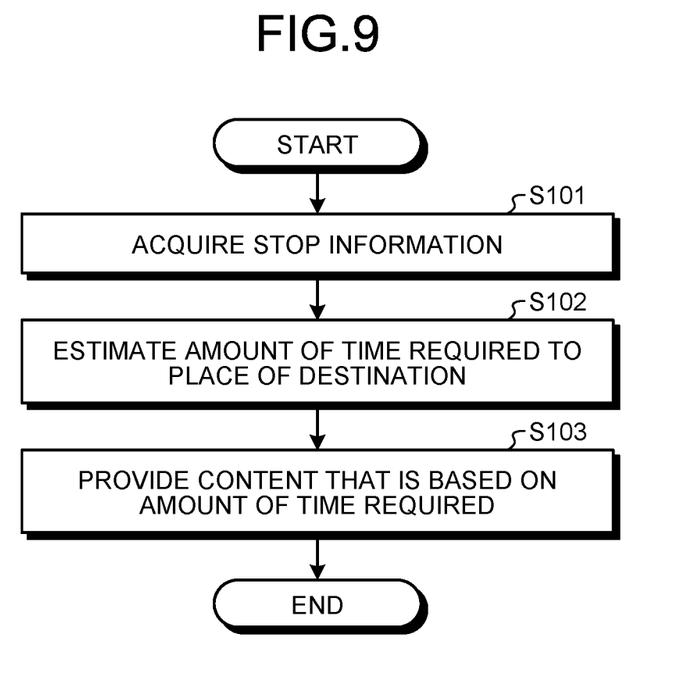
FIG. 9 is a flowchart that illustrates a processing procedure of a process that is executed by an information processing apparatus according to an embodiment.

Next, a procedure of a process that is executed in the information processing apparatus 10 according to an embodiment will be explained by using FIG. 9. FIG. 9 is a flowchart that illustrates a processing procedure of a process that is executed by the information processing apparatus 10 according to an embodiment.

As illustrated in FIG. 9, first, the acquisition unit 21 acquires stop information concerning a situation of a stop of a user at a facility (step S101).

Then, the estimation unit 22 estimates an amount of time required to a place of destination based on acquired stop information (step S102). Then, the provision unit 23 provides a content that is based on an amount of time required that is estimated by the estimation unit 22 (step S103) and ends a process.

As described above, the information processing apparatus 10 according to an embodiment includes the acquisition unit 21, the estimation unit 22, and the provision unit 23. The acquisition unit 21 acquires stop information concerning a situation of a stop of a user at a facility on a route from a place of departure to a place of destination. The estimation unit 22 estimates an amount of time required to a place of destination, based on stop information that is acquired by the acquisition unit 21. The provision unit 23 provides a content that is based on an amount of time required that is estimated by the estimation unit 22. Thereby, it is possible to provide beneficial information to a user.

According to an aspect of an embodiment, it is possible to provide beneficial information to a user.

It is possible for a person(s) skilled in the art to readily derive an additional effect(s) and/or variation(s). Hence, a broader aspect(s) of the present invention is/are not limited to a specific detail(s) and a representative embodiment(s) as illustrated and described above. Therefore, various modifications are possible without departing from the spirit or scope of a general inventive concept that is defined by the appended claim(s) and an equivalent(s) thereof.

What is claimed is:

1. An information processing apparatus comprising:
a computer having a hardware processor and a memory, the hardware processor being configured to:
acquire stop information about a plurality of users that are moving from a place of departure to a place of destination along a route having one or more facilities between the place of departure and the place of destination, the plurality of users including a first user, the stop information indicating a number of the plurality of users, other than the first user, that have stopped at the one or more facilities on the route from the place of departure to the place of destination;

estimate an amount of time required for the first user to reach the place of destination from a current location of the first user, based on the stop information that has been acquired, the amount of time being estimated by (i) dividing the route into a plurality of sections, (ii) determining a time to be spent in each of the plurality of sections based on the stop information, and (iii) estimating the amount of time required for the first user to reach the place of destination from the current location of the first user by summing the determined time to be spent in each of the plurality of sections from the current location of the first user to the place of destination; and transmit, to the first user, data indicating the amount of time that has been estimated, wherein the stop information is obtained from at least image data obtained by one or more stationary cameras installed at least at the one or more facilities on the route from the place of departure to the place of destination.

2. The information processing apparatus according to claim 1, wherein the hardware processor is configured to acquire the stop information from the image data which includes one or more images obtained by the one or more stationary cameras installed at least at the one or more facilities on the route from the place of departure to the place of destination.

3. The information processing apparatus according to claim 1, wherein the hardware processor is configured to acquire the stop information based on a monitored usage of one or more bonuses, by the plurality of users other than the first user, at the one or more facilities.

4. The information processing apparatus according to claim 1, wherein the stop information includes information of an amount of staying time at the one or more facilities and that is dependent on a type of the one or more facilities, and the hardware processor is configured to estimate the amount of time required for the first user to reach the place of destination based on the amount of staying time.

5. The information processing apparatus according to claim 1, wherein the hardware processor is further configured to acquire the stop information based on positional information of one or more mobile terminal devices possessed by the plurality of users other than the first user.

6. The information processing apparatus according to claim 1, wherein the place of destination is a transportation facility, and the hardware processor is configured to estimate the amount of time required for the first user to reach the place of destination to include an amount of waiting time that is needed within the transportation facility before the first user departs the transportation facility on a transportation vehicle that the first user boards at the transportation facility.

7. The information processing apparatus according to claim 6, wherein the transportation facility is a train station, and the hardware processor is configured to estimate the amount of time required for each travel destination of a train that departs from the train station.

8. An information processing system, comprising:

the information processing apparatus according to claim 1; and a terminal device that is possessed by the first user, the terminal device including a display that displays a message indicating the amount of time that has been estimated for the first user to reach the place of destination from the current location of the first user based on the data transmitted by the information processing apparatus.

9. An information processing method executed by a hardware processor of a computer having the hardware processor and memory, the method comprising:

acquiring stop information about a plurality of users that are moving from a place of departure to a place of destination along a route having one or more facilities between the place of departure and the place of destination, the plurality of users including a first user, the stop information indicating a number of the plurality of users, other than the first user, that have stopped at the one or more facilities on the route from the place of departure to the place of destination;

estimating an amount of time required for the first user to reach the place of destination from a current location of the first user, based on the stop information that has been acquired, the amount of time being estimated by (i) dividing the route into a plurality of sections, (ii) determining a time to be spent in each of the plurality of sections based on the stop information, and (iii) estimating the amount of time required for the first user to reach the place of destination from the current location of the first user by summing the determined time to be spent in each of the plurality of sections from the current location of the first user to the place of destination; and transmitting, to the first user, data indicating the amount of time that has been estimated, wherein the stop information is obtained by the hardware processor via a communication interface of the computer that is coupled to the hardware processor and receives the stop information via a network as at least image data obtained by one or more stationary cameras installed at least at the one or more facilities on the route from the place of departure to the place of destination.

10. An information processing apparatus comprising:

a computer having a hardware processor and a memory, the hardware processor being configured to:

acquire stop information about a plurality of users that are moving from a place of departure to a place of destination along a route having one or more facilities between the place of departure and the place of destination, the plurality of users including a first user, the stop information indicating a number of the plurality of users, other than the first user, that have stopped at the one or more facilities on the route from the place of departure to the place of destination;

estimate an amount of time required for the first user to reach the place of destination from a current location of the first user, based on the stop information that has been acquired, the amount of time being estimated by (i) dividing the route into a plurality of sections, (ii) determining a time to be spent in each of the plurality of sections based on the stop information, and (iii) estimating the amount of time required for the first user to reach the place of destination from the current location of the first user by summing the determined time to be spent in each of the plurality of sections from the current location of the first user to the place of destination; and transmit, to the first user, data indicating the amount of time that has been estimated, wherein the stop information is obtained from at least one of: (a) image data obtained by one or more cameras installed on the route from the place of departure to the place of destination, and (b) positional information of one or more mobile terminal devices possessed by the plurality of users other than the first user, and the stop information is further acquired based on a monitored usage of one or more bonuses, by the plurality of users other than the first user, at the one or more facilities where the one or more bonuses are coupons that are provided to the plurality of users other than the first user by the one or more facilities.

11. The information processing apparatus according to claim 1, wherein each of the one or more facilities is a place of business.

12. The information processing apparatus according to claim 11, wherein the place of destination is a transportation facility, and the place of departure is an event facility or a location between the event facility and the transportation facility.

13. The information processing method according to claim 9, wherein each of the one or more facilities is a place of business.

14. The information processing method according to claim 13, wherein the place of destination is a transportation facility, and the place of departure is an event facility or a location between the event facility and the transportation facility.

15. The information processing apparatus according to claim 10, wherein each of the one or more facilities is a place of business.

16. The information processing apparatus according to claim 15, wherein the place of destination is a transportation facility, and the place of departure is an event facility or a location between the event facility and the transportation facility.

* * * * *